May 21, 1946.    S. E. HEYMANN    2,400,509
AIRCRAFT HEATING SYSTEM
Filed Oct. 15, 1942    2 Sheets-Sheet 1

Inventor:
Seymour E. Heymann
By Williams, Bradbury & Hinkle
Attorneys.

May 21, 1946.  S. E. HEYMANN  2,400,509
AIRCRAFT HEATING SYSTEM
Filed Oct. 15, 1942  2 Sheets-Sheet 2

Inventor:
Seymour E. Heymann
by Williams, Bradbury & Hinkle
Attorneys.

Patented May 21, 1946

2,400,509

UNITED STATES PATENT OFFICE 2,400,509

AIRCRAFT HEATING SYSTEM

Seymour E. Heymann, Chicago, Ill., assignor to Stewart-Warner Corporation, Chicago, Ill., a corporation of Virginia Application October 15, 1942, Serial No. 462,130

5 Claims. (Cl. 237—12.3)

My invention relates generally to aircraft heating systems and apparatus, and more particularly to control means therefor.

It has become common practice to utilize a portion of the fuel and air mixture supplied to the aircraft engine by its supercharger as a source of combustible mixture for the operation of one or more internal combustion type heaters for heating the cabin and other parts of the aircraft. The products of combustion from the heater have ordinarily been discharged overboard, but in some instances have been returned to the inlet of the supercharger. Under some conditions of operation of the airplane, it is desirable to utilize the differential pressure between the inlet and the outlet of the supercharger to cause flow of the combustible mixture to the heater and to cause the discharge of the products of combustion therefrom, while under other conditions of operation, the pressure differential between the pressure side of the supercharger and the atmosphere is sufficient for satisfactory operation of the heater.

Although under substantially all conditions of airplane operation, the heater will operate satisfactorily when it is connected between the outlet and the inlet of the engine supercharger, there is a slight disadvantage in permanently connecting the heater in this manner. Even though the products of combustion entering the inlet of the supercharger form but a small percentage of the flow through the supercharger, and the dilution of the mixture supplied to the engines therefore does not noticeably affect engine operation, such dilution must have some effect, and it is therefore advisable to avoid such admixture of the products of combustion from the heater with the charge flowing to the engine whenever possible.

It is therefore an object of my invention to provide improved means for automatically controlling the flow of exhaust gases from an internal combustion type heater, either to the atmosphere or to the inlet side of the engine supercharger, depending upon the conditions under which the airplane is operating.

A further object is to provide an improved diverter valve and operating means therefor for controlling the discharge of an internal combustion type heater.

Other objects will appear from the following description, reference being had to the accompanying drawings, in which:

Fig. 2 is a central longitudinal sectional view of the three-way diverter valve; and, Fig. 3 is a side elevational view of said valve.

Figure 1:
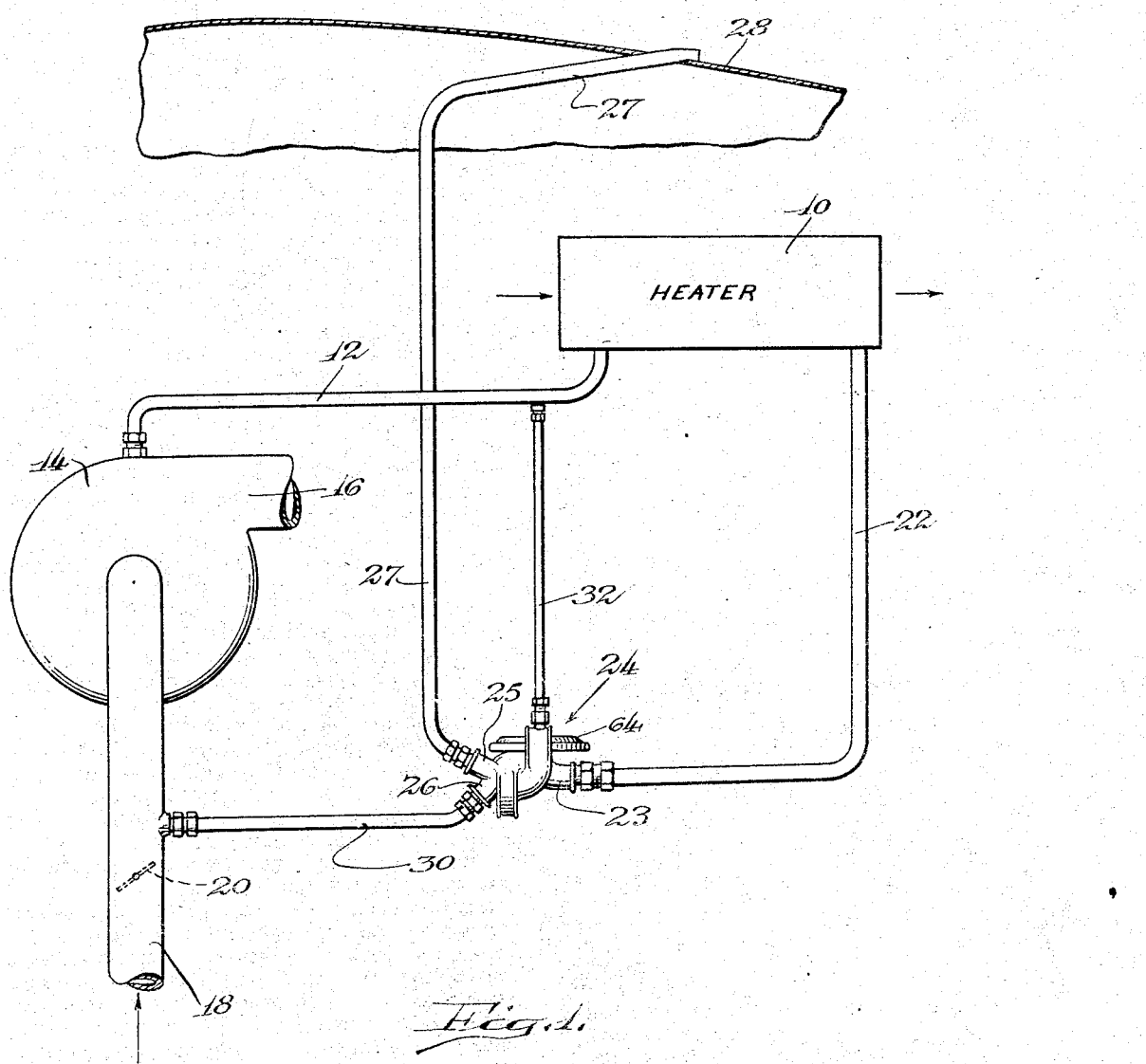
Fig. 1 is a diagrammatic view of a typical heater installation embodying the invention.

As shown in Fig. 1, the heating system comprises an internal combustion type heater 10, which may be of any suitable construction, such, for example, as that shown in the copending application of H. J. DeN. McCollum, Serial No. 447,345, filed June 7, 1942.

This heater is illustrated as being supplied with a combustible mixture of fuel and air through a conduit 12 which withdraws the mixture from the pressure side of a supercharger 14, which supplies an explosive mixture to the engines through a conduit 16. The mixture is supplied to the supercharger 14 through an induction pipe 18 controlled by a throttle valve 20. The products of combustion from the heater 10 are withdrawn through a conduit 22 leading to the inlet 23 of an automatically operated three-way valve 24. This valve has two outlets 25 and 26, the outlet 25 being connected by a conduit 27 with the atmosphere, the conduit projecting through the skin 28 of the airplane, preferably at a point at which the pressure is reduced when the airplane is in flight.

The other outlet 26 of the three-way valve 24 is connected by a conduit 30 with the induction pipe 18 at a point between the throttle valve 20 and the inlet of the supercharger 14, so as to be at all times subjected to the full suction produced by the supercharger. The three-way valve 24 has its operation controlled by the pressure within the conduit 12, a suitable conduit 32 connected between the three-way valve 24 and the conduit 12 being provided to transmit this controlling pressure to the valve.

As best shown in Figs. 2 and 3, the three-way valve 24 comprises an integral body casting 34 having three bosses forming the inlet 23 and outlets 25 and 26. The body has a generally cylindrical bore 36. Secured to a shaft 38 is a valve vane or disc 40 which fits snugly in the cylinder 36. Fixedly secured to the end of the shaft 38 and outside of the body 34, is a three-armed lever 42. Arms 44 and 45 of the lever 42 are adapted to engage stop lugs 46 and 47 formed on the body casting 34 to limit the extent of oscillatory movement of the shaft 38, and hence of the vane 40 from the position in which the vane is shown in full lines in Fig. 2 to the position in which it is shown in dotted lines in said figure. The arm 44 is connected by a tension spring 48 with an anchoring bracket 50 so as normally to bias the three-armed lever 42 and the vane 40 to the positions in which these parts are shown in the drawings (the full-line position of vane 40). A tension spring 52 has one end connected to the end of the third arm 54 of the three-armed lever 42, and its other end anchored to a stud 56 projecting from the body 34.

The arm 45 of the three-armed lever 42 is connected to a flexible diaphragm 58 by means of a rod 60 and an adjustable clevis 62. The periphery of the diaphragm 58 is secured to a peripheral edge of a diaphragm casing 64 by a folded seam.

The casing 64 is secured to a bracket 66 by a pipe fitting 68. The fitting 68 has the conduit 32 connected thereto.

In operation of the system, it will be apparent that whenever the pressure at the outlet side of the supercharger 14 is sufficiently high for satisfactory operation of the heater utilizing the overboard discharge conduit 27, this high pressure will be exerted upon the diaphragm 58 and swing the valve vane 40 from its full-line to its dotted-line position (Fig. 2). It will be apparent also that to accomplish such movement of the valve to the dotted-line position, the pressure exerted upon the diaphragm 58 must be sufficient to overcome the tension of the spring 48 and, during the initial portion of the movement, to overcome the additional tension provided by the spring 52. During the latter portion of the movement of the lever 42, the spring 52 will assist such movement, the spring 52 thus being effective to cause quick snap-over of the vane from one of its operating positions to the other operating position and preventing the vane 40 from being brought to rest in a median position.

When the valve is thus moved to the dotted-line position, it is arrested in this position by the engagement of the arm 44 with the lug 46, and the products of combustion from the heater entering the inlet 24 will flow through the upper portion of the valve cylinder 36 and from this cylinder through the outlet 25 and conduit 27 to the atmosphere.

Whenever, due to a change in the character of operation of an airplane engine, as by causing the engine to operate at full power, the pressure at the outlet of the supercharger 14 decreases, such decreased pressure will be reflected upon the surface of the diaphragm 58 so that the spring 48 will be effective to return the valve 40 to its full-line position. When the valve 40 is in its full-line position, the products of combustion from the heater are cut off from flow to the atmosphere through the conduit 27 and are diverted to flow through the outlet 26 and conduit 30 into the induction pipe 18. Since, as previously stated, there is always a difference in pressure between the inlet and outlet of the supercharge 14 adequate to cause satisfactory operation of the heater 10, the heater will continue in operation despite such considerable decrease in the pressure at which the combustible mixture is supplied to it.

The valve 24 is preferably located so that the lower surface of its diaphragm 58 is subjected to atmospheric pressure. Thus it will be seen that the movement of the diaphragm 58, and hence the shifting of the valve 40, is responsive to the differential pressure between the pressure side of the supercharger 14 and the atmosphere, and that whenever this pressure difference is not adequate for operation of the heater, the valve is shifted to a position in which the heater exhaust is drawn into the low pressure side of the supercharger 14, which will at all times be at a sub-atmospheric pressure.

While I have shown and described a particular embodiment of my invention, it will be apparent to those skilled in the art that numerous modifications and variations may be made therein without departing from the underlying principles of the invention. I therefore desire, by the following claims, to include within the scope of my invention all such modifications and variations by which substantially the results of my invention may be obtained by the use of substantially the same or equivalent means.

I claim:

1. In a heating system for aircraft equipped with an engine supercharger, a hermetically sealed internal combustion type heater, means for conveying a combustible mixture from the pressure side of said supercharger to said heater, alternatively utilized discharge conduits for conveying the products of combustion from the heater, either to the atmosphere or to the inlet of said supercharger, valve means for controlling the flow through said discharge conduits, and means responsive to the difference in pressure between the pressure side of said supercharger and the atmosphere for operating said valve means to cause the products of combustion to flow to the atmosphere through said discharge conduits whenever said pressure difference exceeds a predetermined value, and operating said valve to cause flow of the products of combustion from said heater to the inlet side of said supercharger whenever said pressure difference falls substantially below said predetermined value.

2. The combination set forth in claim 1 in which said differential pressure responsive means comprises a diaphragm having one side thereof subjected to the pressure at the outlet of said supercharger and the other side thereof subjected to atmospheric pressure, and said valve means comprises a three-way valve operated by said diaphragm.

3. The combination set forth in claim 1 in which said valve means comprises a three-way valve, said pressure difference responsive means comprises a diaphragm having its opposite sides subjected respectively to atmospheric pressure and the pressure at the outlet of said supercharger, and in which quick-snap-over mechanism is provided to cause complete and rapid movement of said valve.

4. A control for an aircraft heater of the internal combustion type supplied with combustible mixture from a supercharger and adapted to exhaust alternatively through a tail pipe or through a pipe leading to the intake of the supercharger, a two-position valve controlling communication between the exhaust of said heater and said alternative pipes, and motor mechanism for shifting said valve in response to differences in pressure between the fuel inlet of the heater and the atmosphere, said motor mechanism operating to move said valve rapidly between its two operative positions and thereby to cause the exhaust of the heater to be discharged either to the atmosphere through said tail pipe or to the intake of the supercharger.

5. A control for an aircraft heater of the internal combustion type supplied with a combustible mixture from the aircraft supercharger and adapted to exhaust either through a tail pipe or through a pipe leading to the intake of the supercharger, a valve for controlling communication between the exhaust of said heater and said pipes, and motor mechanism operable in response to differences in pressure between the fuel inlet of the heater and the atmosphere to shift said valve to connect the exhaust of the heater either to said tail pipe or to the intake of the supercharger.

SEYMOUR E. HEYMANN.